(12) United States Patent
Kudo (10) Patent No.: US 8,792,051 B2
(45) Date of Patent: Jul. 29, 2014

(54) DRIVING DEVICE, LENS BARREL, AND OPTICAL APPARATUS INCLUDING THE LENS BARREL

(75) Inventor: Shinya Kudo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 325 days.

(21) Appl. No.: 13/308,340

(22) Filed: Nov. 30, 2011

(65) Prior Publication Data

US 2012/0140115 A1    Jun. 7, 2012

(30) Foreign Application Priority Data

Dec. 6, 2010    (JP) ................................. 2010-271697

(51) Int. Cl.
*H04N 5/225* (2006.01)
*H01L 41/00* (2013.01)
*H02N 2/00* (2006.01)

(52) U.S. Cl.
USPC ...................................... 348/373; 310/323.01

(58) Field of Classification Search
CPC ........ H04N 5/225; H04N 5/353; H04N 5/355
USPC .................................................. 348/373–376
See application file for complete search history.

(56) References Cited

U.S. PATENT DOCUMENTS

| | | | | |
|---|---|---|---|---|
| 5,225,941 | A * | 7/1993 | Saito et al. ..................... | 359/824 |
| 6,067,421 | A * | 5/2000 | Kitazawa et al. ............. | 396/133 |
| 6,078,438 | A * | 6/2000 | Shibata et al. ................ | 359/819 |
| 7,084,550 | B2 * | 8/2006 | Sasaki et al. ............. | 310/323.17 |
| 7,099,093 | B2 * | 8/2006 | Jeong et al. .................... | 359/823 |
| 7,187,104 | B2 * | 3/2007 | Yamamoto et al. ...... | 310/323.02 |
| 7,199,506 | B2 * | 4/2007 | Sasaki et al. ................... | 310/328 |
| 7,480,109 | B1 * | 1/2009 | Hu et al. ........................ | 359/824 |
| 7,518,286 | B2 * | 4/2009 | Kojima et al. ........... | 310/323.01 |
| 7,646,136 | B2 * | 1/2010 | Adachi et al. ............. | 310/323.16 |
| 2006/0088304 | A1 * | 4/2006 | Aoshima .......................... | 396/85 |
| 2006/0113867 | A1 * | 6/2006 | Sakatani et al. ......... | 310/323.17 |
| 2007/0069609 | A1 | 3/2007 | Kojima et al. | |
| 2008/0085110 | A1 | 4/2008 | Su | |
| 2009/0015100 | A1 | 1/2009 | Kojima et al. | |
| 2009/0219636 | A1 * | 9/2009 | Yasuda .......................... | 359/827 |

FOREIGN PATENT DOCUMENTS

| | | |
|---|---|---|
| CN | 1943101 A | 4/2007 |
| CN | 201477278 U | 5/2010 |
| CN | 201489176 U | 5/2010 |
| JP | 1-268462 A | 10/1989 |
| JP | 2003-339176 A | 11/2003 |
| JP | 2005-354787 A | 12/2005 |
| JP | 2007-312519 A | 11/2007 |
| TW | 200928569 A | 7/2009 |

* cited by examiner

*Primary Examiner* — Roberto Velez
*Assistant Examiner* — Tuan Le
(74) *Attorney, Agent, or Firm* — Canon USA Inc IP Division (57) ABSTRACT

In a driving device, a distance from a guide member to a vibrator is less than that from the guide member to a permanent magnet in a plane perpendicular to a guiding direction of a guide member. An attraction force between the permanent magnet and a magnetic body acts as a force to rotate (i.e., a rotating force) a holding member about an axis of the guide member, and the vibrator is pressed against a contact member by the rotating force.

9 Claims, 7 Drawing Sheets

MODE-A                MODE-B

DRIVING DEVICE, LENS BARREL, AND OPTICAL APPARATUS INCLUDING THE LENS BARREL

BACKGROUND OF THE INVENTION

1. Field of the Invention

The present invention relates to a driving device, a lens barrel, and an optical apparatus including the lens barrel. More particularly, the present invention relates to a technique for relatively moving a vibrator and a contact member.

2. Description of the Related Art

In the field of vibration actuators, the so-called linear ultrasonic motor, i.e., a vibration actuator producing a linear motion, has been developed. The linear ultrasonic motor is featured in providing a relatively large output for the size of the vibrator, and in having good controllability. Such a vibration actuator producing a linear motion is used for driving a lens unit that is disposed in a lens barrel of a camera, for example.

Regarding that type of vibration actuator, Japanese Patent Laid-Open No. 2007-312519 proposes a mechanism for pressing a vibrator and a contact member as a driven member, the contact member being held in contact with the vibrator. More specifically, Japanese Patent Laid-Open No. 2007-312519 discloses a method of contacting the vibrator and the contact member with each other under pressure by utilizing a magnetic force of a permanent magnet. Also, Japanese Patent Laid-Open No. 2007-312519 discloses a structure that the permanent magnet is disposed on the vibrator side. In the disclosed structure, the permanent magnet is held by a holding member disposed between the vibrator and the contact member. Further, the vibrator is brought into pressure contact with the contact member by a magnetic attraction force. According to Japanese Patent Laid-Open No. 2007-312519, a small-sized vibration actuator having good spatial efficiency is realized by arranging the permanent magnet in a space that is formed between the vibrator and the contact member.

U.S. Patent Application Publication 2007/069609A1 proposes a structure that a permanent magnet is disposed on the contact member side. Further, U.S. Patent Application Publication 2007/069609A1 discloses a contact member including a slider base having a square bar shape and made of a magnet material, and a friction member disposed on a surface of the slider base on the side contacting with the vibrator.

However, when the permanent magnet is arranged in the space formed between the vibrator and the contact member as disclosed in Japanese Patent Laid-Open No. 2007-312519, the size of the permanent magnet is restricted by the size of the space, and a sufficient pressing force is not obtained in some cases. Further, when the contact member is fixed to a mirror barrel portion and the vibrator is moved, response of the vibrator may degrade due to the weight of the permanent magnet if the permanent magnet is arranged on the vibrator side.

When the permanent magnet is arranged on the contact member side as disclosed in U.S. Patent Application Publication 2007/069609A1, the permanent magnet is required to have a length longer than that of a driving range and the cost is increased in proportion to the length of the driving range.

SUMMARY OF THE INVENTION

The present invention enables a desired pressing force to be applied between a vibrator and a contact member without increasing a cost.

A driving device according to an embodiment of the present invention includes a vibrator having an elastic body and an electromechanical energy transducer fixed to the elastic body, a portion of a contact member arranged to contact with the vibrator, a permanent magnet, a magnetic body arranged proximate the permanent magnet to generate an attraction force between the permanent magnet and the magnetic body, a holding member arranged to hold the vibrator and the permanent magnet, and a guide member arranged to restrict a moving direction of the holding member, wherein a distance from the guide member to the vibrator is less than a distance from the guide member to the permanent magnet in a plane perpendicular to a guiding direction of the guide member, the attraction force between the permanent magnet and the magnetic body acts as a force to rotate the holding member about a longitudinal axis of the guide member, the vibrator being pressed against the contact member by the rotating force, and the vibrator and the contact member are moved relative to each other when an AC voltage is applied to the electromechanical energy transducer of the vibrator.

A lens barrel according to another embodiment of the present invention includes a vibrator having an elastic body and an electromechanical energy transducer fixed to the elastic body, a portion of a contact member arranged to contact with the vibrator, a permanent magnet, a magnetic body arranged to generate an attraction force between the permanent magnet and the magnetic body, a lens, a holding member arranged to hold the vibrator, the permanent magnet, and the lens, and a guide member arranged to restrict a moving direction of the holding member, wherein a distance from the guide member to the vibrator is less than a distance from the guide member to the permanent magnet in a plane perpendicular to a guiding direction of the guide member, the attraction force between the permanent magnet and the magnetic body acts as a force rotating the holding member about an axis of the guide member, the vibrator being pressed against the contact member by the rotating force, and the holding member is moved by the force in a direction of an optical axis of light incident on the lens when an AC voltage is applied to the electromechanical energy transducer of the vibrator.

With the embodiments of the present invention, since a magnetic pressing unit is disposed at a position away from the vibrator and the contact member, a magnetic attraction force can be amplified based on the principle of leverage and can be utilized as a pressing force to press the vibrator toward the contact member side. As a result, a sufficient pressing force can be obtained without increasing the cost.

Further features of the present invention will become apparent from the following description of exemplary embodiments with reference to the attached drawings.

DESCRIPTION OF THE EMBODIMENTS

Embodiments of the present invention will be described below with reference to the drawings.

First Embodiment

Figure 1:
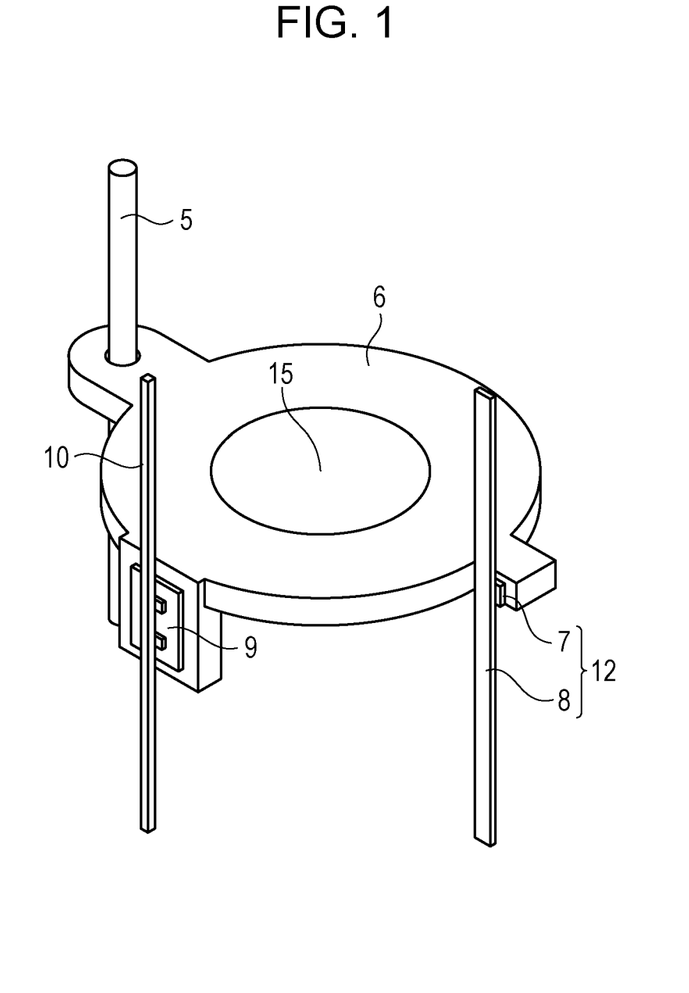
FIG. 1 is a perspective view to explain the construction of a driving device according to a first embodiment of the present invention.

An exemplary construction of a driving device according to a first embodiment of the present invention will be described below with reference to FIG. 1. The driving device of the first embodiment includes a vibrator 9, a contact member 10, a permanent magnet 7, a magnetic body 8, a holding member 6, and a guide member 5. Vibration of the vibrator 9 is excited by a piezoelectric element 2 (see FIGS. 2A and 2B) that is an electro-mechanical energy transducer. The vibrator 9 and the contact member 10 contacting with the vibrator 9 are moved relatively to each other. In the embodiment of the present invention, the vibrator 9 and the contact member 10 constitute a vibration actuator.

Further, in this first embodiment, the permanent magnet 7 and the magnetic body 8 constitute a magnetic pressing unit 12. A magnetic attraction force generated between the permanent magnet 7 and the magnetic body 8 is utilized to press the vibrator 9 against the contact member 10. The magnetic body 8 is made of a ferromagnetic material, such as iron, cobalt, nickel, an alloy of some of the former elements, or martensitic stainless steel.

The holding member 6 holds the vibrator 9 and the permanent magnet 7. When a lens 15 is disposed at a center of the holding member 6, the holding member 6 serves also as a lens holder. The holding member 6 is not only rotatable about an axis of the guide member 5 (i.e., a longitudinal axis of the guide member 5) that restricts the moving direction of the holding member 6, but also movable along the guide member 5. In this first embodiment, the guide member 5, the contact member 10, and the magnetic body 8 are fixedly supported to a base (not shown). Accordingly, when a driving voltage (e.g., an AC voltage) is applied to the electro-mechanical energy transducer 2, a relative moving force is generated between the vibrator 9 and the contact member 10, whereby the holding member 6 is moved by the moving force along the guide member 5.

Figure 2A:
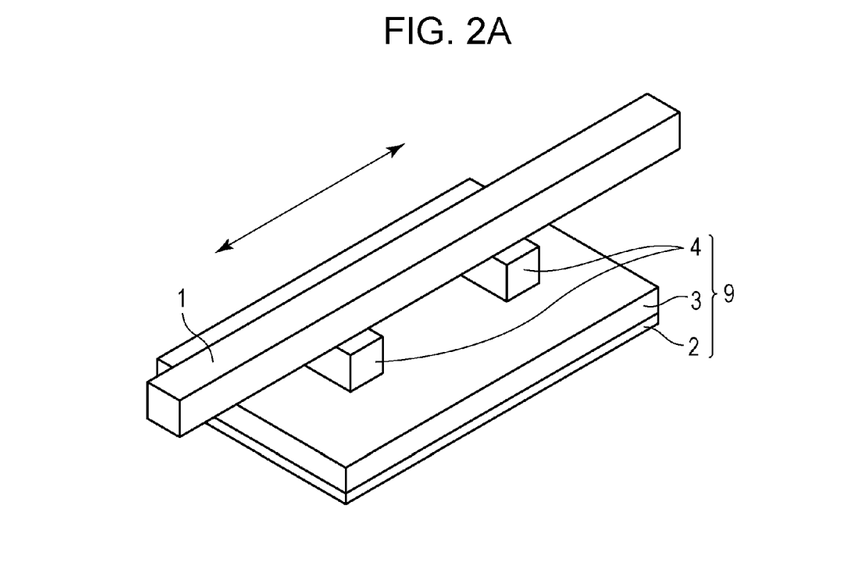
FIGS. 2A and 2B are external perspective views to explain the construction of a vibration actuator to which the present invention is applicable, and vibration modes of the vibration actuator.

A principle of operation of a vibration actuator to which the present invention is applicable is described below with reference to FIGS. 2A and 2B. FIG. 2A is an external perspective view illustrating the basic construction of the vibration actuator. A vibrator 9 of the vibration actuator includes an elastic body 3 in the form of a rectangular plate made of a metal material, and a piezoelectric element (electro-mechanical energy transducer) 2 bonded to a rear surface of the elastic body 3. Two projections 4 are provided, as contact portions contacting with a driven member 1, at predetermined positions on a front surface of the elastic body 3. It is to be noted that the contact member 10 in FIG. 1 corresponds to the driven member 1 in FIG. 2A. While, in FIG. 1, the contact member 10 is fixed to the base (not shown) and the vibrator 9 is movable, FIGS. 2A and 2B illustrate, for convenience of explanation, the case where the vibrator 9 is fixed and the driven member 1, i.e., the contact member, is movable.

Figure 2B:
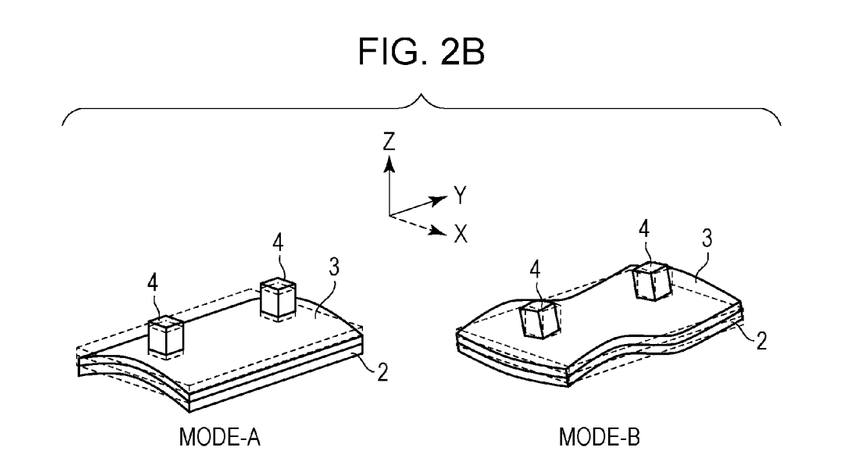

In this first embodiment, as illustrated in FIG. 2B, an AC voltage is applied to the electro-mechanical energy transducer 2 of the vibrator 9, and two out-of-plane bending vibration modes (MODE-A and MODE-B) are excited in the vibrator 9. MODE-A represents a primary out-of-plane bending vibration mode in which two nodes appear parallel to the direction of a Y-axis defined in FIG. 2B, i.e., the lengthwise direction of the vibrator 9. The vibration in MODE-A excites, in the projection 4, vibration that displaces in the direction (Z-axis direction) perpendicular to a surface of the projection 4 held in contact with the driven member 1. MODE-B represents a secondary out-of-plane bending vibration mode in which three nodes appear substantially parallel to the direction of an X-axis defined in FIG. 2B, i.e., the widthwise direction of the vibrator 9. The vibration in MODE-B excites, in the projection 4, vibration that displaces in the direction (Y-axis direction) parallel to the surface of the projection 4 held in contact with the driven member 1.

Figure 9A:
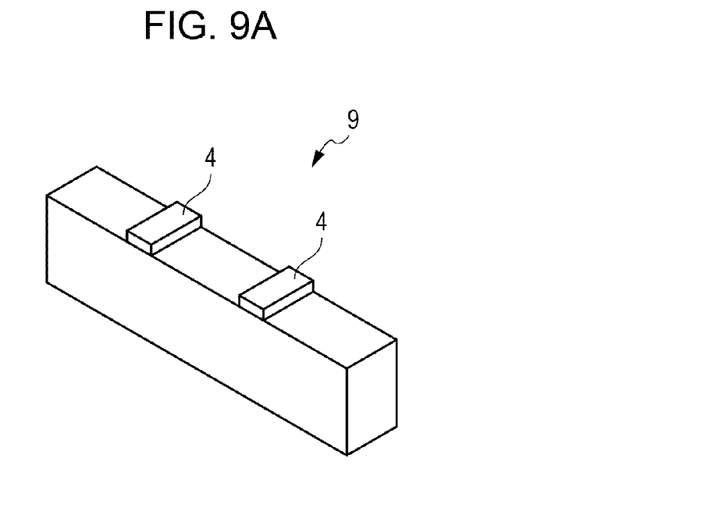
FIGS. 9A and 9B are perspective views to explain vibration modes of a vibrator to which the present invention is applicable.
Figure 9B:
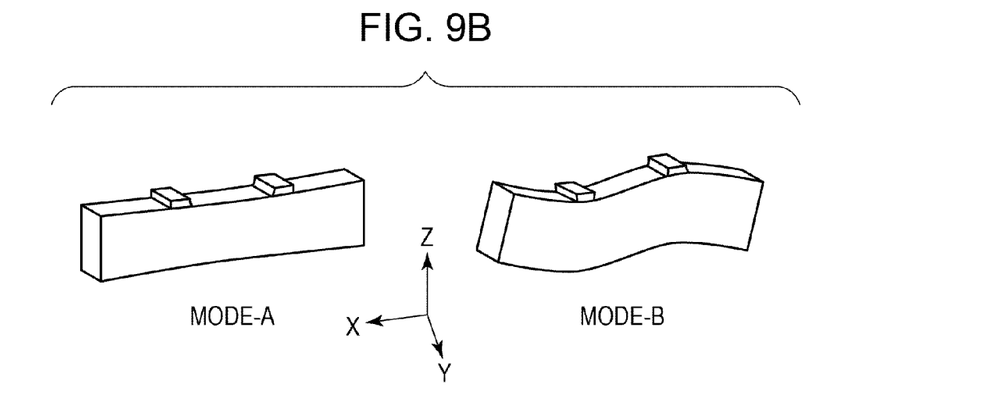

By combining those two vibration modes with each other, an elliptical motion substantially in a YZ-plane is generated in an upper surface of the projection 4 as the contact portion, whereby a force driving the driven member 1 in a direction substantially matched with the Y-axis direction is generated. Such a driving force causes the driven member 1 to move relatively to the vibrator 9. However, applications of the present invention are not limited to the vibrator having the above-described construction, and the present invention may also be applied to vibrators exciting vibrations other than above-described out-of-plane bending vibration modes. For example, the present invention can be applied to a vibrator having a construction to excite vibrations in other types of vibration modes illustrated in FIGS. 9A and 9B. A vibrator 9 illustrated in FIGS. 9A and 9B is substantially parallelepiped in shape. As illustrated in FIG. 9B, vibrations are excited in the vibrator 9 in two modes, i.e., a primary extensional vibration mode in which the vibrator extends and contracts in the X-axis direction (MODE-A), and a secondary out-of-plane bending vibration mode (MODE-B) in which three nodes appear substantially parallel to the Y-axis direction. By combining those two different vibration modes with each other, elliptical vibration substantially in a XZ-plane is generated in an upper surface of each projection 4. Thus, by operating that type of the vibrator in such a manner, the present invention can also be applied thereto as with the vibrator illustrated in FIGS. 2A and 2B.

By causing the vibrations in the above-described vibration modes to be excited in the vibrator 9 in the state where the driven member 1 is held in pressure contact with the projections 4, the driven member 1 can be linearly moved with the elliptical motion of the projections 4. As a matter of course, when the contact member 10 is fixed as illustrated in FIG. 1, the vibrator 9 is moved.

Figure 3:
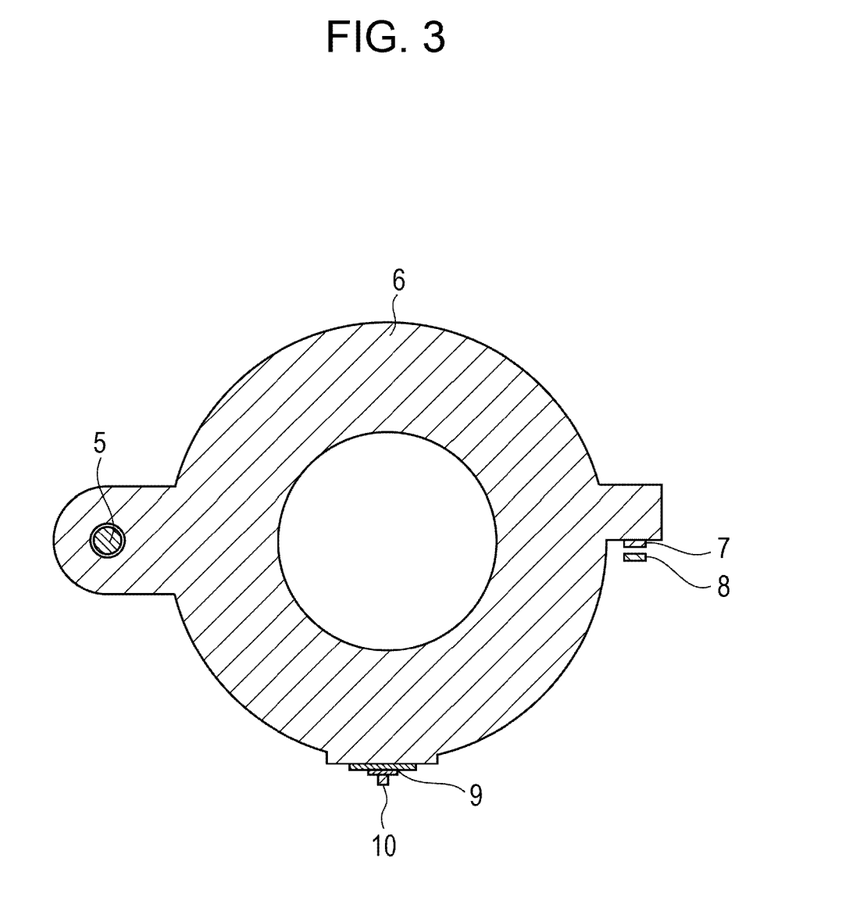
FIG. 3 is a sectional view of the driving device according to the first embodiment of the present invention.

An exemplary construction of a pressing mechanism of the driving device according to the first embodiment of the present invention will be described below with reference to FIG. 3. FIG. 3 is a sectional view of the driving device, illustrated in FIG. 1, taken along a plane perpendicular to the axial direction of the guide member 5 (i.e., in the guiding direction of the guide member 5).

The holding member 6 has a degree of freedom about the axis of the guide member 5 such that it is rotatable about the axis of the guide member 5. Further, the holding member 6 may have another degree of freedom being linearly movable in the axial direction of the guide member 5. The permanent magnet 7 and the magnetic body 8, which is fixed to the base (not shown), generate a magnetic attraction force therebetween. The magnetic attraction force produces torque about the axis of the guide member 5. The torque acts as a force causing the holding member 6 to rotate about the axis of the guide member 5, and the rotating force presses the vibrator 9 against the contact member 10.

In the first embodiment of the present invention, the force pressing the vibrator 9 against the contact member 10 with the torque, which is generated by the permanent magnet 7 and the magnetic body 8, is amplified based on the principle of leverage, i.e., according to the positional relationship among the guide member 5, the permanent magnet 7, and the vibrator 9. More specifically, in the first embodiment of the present invention, a distance from the guide member 5 to the vibrator 9 is shorter than that from the guide member 5 to the permanent magnet 7 as viewed in a plane perpendicular to the axial direction of the guide member 5. Thus, in the illustrated positional relationship, the guide member 5 serves as a fulcrum, the permanent magnet 7 serves as a power point, and the vibrator 9 serves as a point of action. With that construction, the magnetic attraction force between the permanent magnet 7 and the magnetic body 8 can be amplified and utilized as the force pressing the vibrator 9 against the contact member 10.

Because the vibrator 9 is brought into pressure contact with the contact member 10, the holding member 6 is restricted in rotation about its axis. Further, in this first embodiment, an air gap is formed between the permanent magnet 7 and the magnetic body 8 such that the permanent magnet 7 and the magnetic body 8 are kept out of contact with each other. Accordingly, the above-described construction does not generate resistance due to friction between the permanent magnet 7 and the magnetic body 8. The air gap and hence the pressing force can be adjusted by adjusting the relative positional relationship between the permanent magnet 7 and the magnetic body 8.

Moreover, in this first embodiment, the positional relationship among the guide member 5, the permanent magnet 7, and the vibrator 9, as viewed in the cross-section illustrated in FIG. 3, is maintained even when the holding member 6 is moved along the guide member 5. Thus, since the pressing force is amplified based on the principle of leverage as described above, the size of the permanent magnet 7 can be relatively reduced in order to obtain the necessary pressing force.

Second Embodiment

An exemplary construction of a driving device differing in mechanism of the magnetic pressing unit 12 in the first embodiment will be described below as a second embodiment with reference to FIGS. 4 and 5. Because the construction of the second embodiment is similar to that of the first embodiment except for the magnetic pressing unit 12, the description of the similar construction to that of the first embodiment is omitted.

Figure 4:
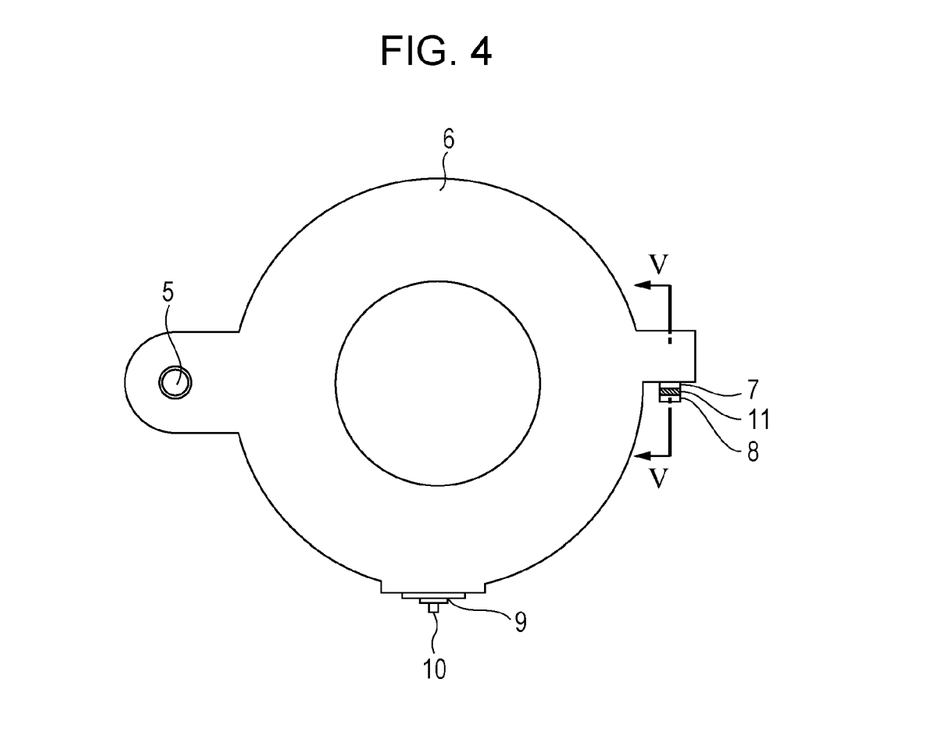
FIG. 4 is a plan view of a driving device according to a second embodiment of the present invention.
Figure 5:
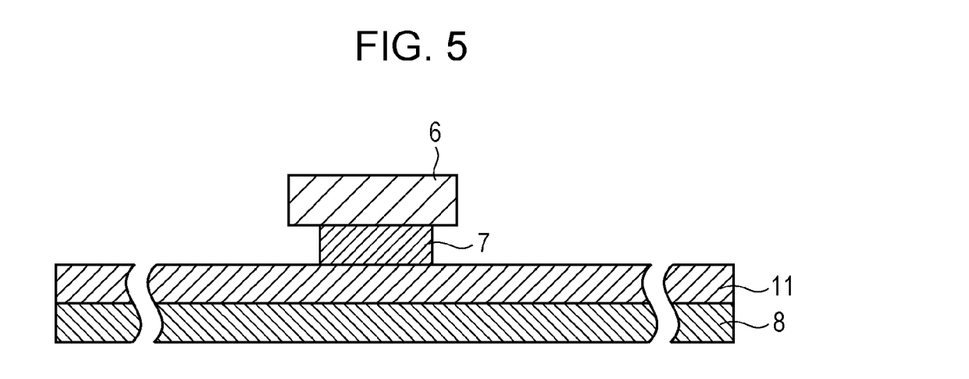
FIG. 5 is a sectional view of a magnetic pressing unit according to the second embodiment of the present invention.

FIG. 4 is a plan view of the driving device according to the second embodiment. In FIG. 4, the magnetic pressing unit 12, which is illustrated in FIG. 1, includes a permanent magnet 7, a sliding member 11, and a magnetic body 8. FIG. 5 is a sectional view taken along a line V-V in FIG. 4. As illustrated in FIG. 5, the sliding member 11 is arranged between the permanent magnet 7 and the magnetic body 8. A gap between the permanent magnet 7 and the magnetic body 8 can be kept constant with the sliding member 11 interposed between them.

The sliding member 11 is preferably made of a material having a small friction coefficient. In more detail, the material of the sliding member 11 is preferably selected to have such a friction coefficient that a frictional force between the permanent magnet 7 and the sliding member 11 is less than the frictional force between the vibrator 9 and the contact member 10. Using that type of sliding member 11 reduces an increase of the load when the holding member 6 is moved.

The sliding member 11 may be constituted as a magnetic scale, which is magnetized at a predetermined pitch, such that the sliding member 11 serves also as a position sensor in combination with a magnetic sensor arranged on the holding member 6.

Third Embodiment

An exemplary construction of a driving device differing in mechanism of the magnetic pressing unit 12 in the first and second embodiments will be described below as a third embodiment with reference to FIGS. 6 and 7. Because the construction of the third embodiment is similar to that of the first embodiment except for the magnetic pressing unit 12 and the holding member 6, the description of the similar construction to that of the first embodiment is omitted.

Figure 6:
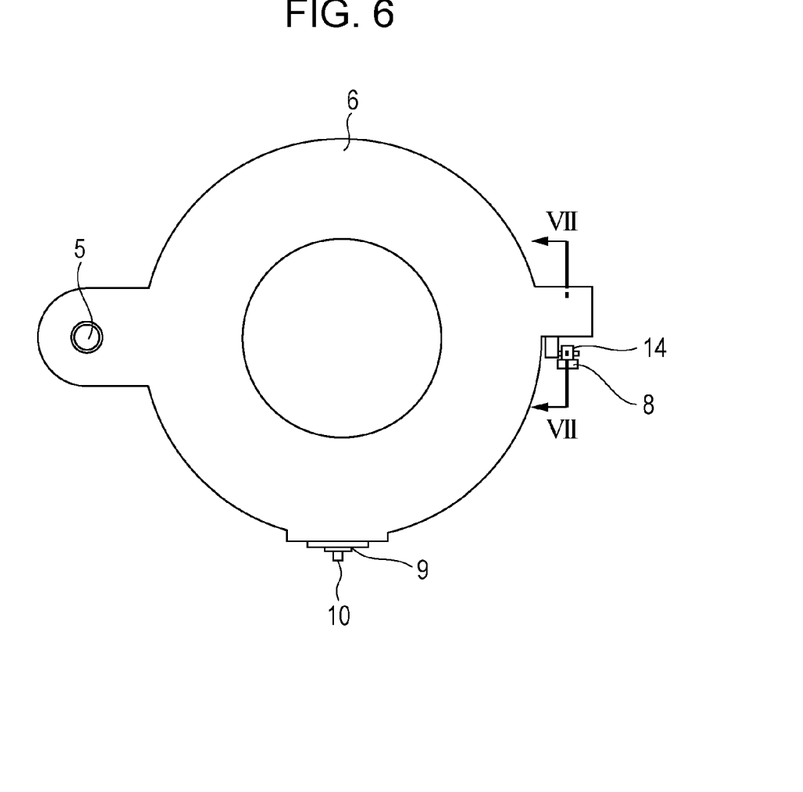
FIG. 6 is a plan view of a driving device according to a third embodiment of the present invention.
Figure 7:
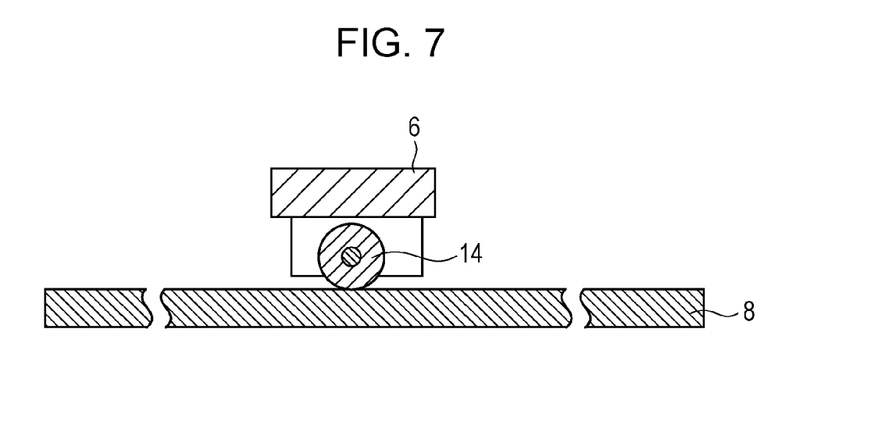
FIG. 7 is a sectional view of a magnetic pressing unit according to the third embodiment of the present invention.

FIG. 6 is a plan view of the driving device according to the third embodiment. As illustrated in FIG. 6, the magnetic pressing unit 12, which is illustrated in FIG. 1, in this third embodiment includes a roller 14 made of a permanent magnet, and a magnetic body 8. The holding member 6 includes a shaft for rotation about which the roller 14 is rotatable. FIG. 7 is a sectional view taken along a line VII-VII in FIG. 6. The roller 14 made of the permanent magnet, illustrated in FIG. 7, is rotatable while contacting with the magnetic body 8. With this third embodiment, since the roller 14 made of the permanent magnet rolls while contacting with the magnetic body 8, a frictional force generated by the magnetic pressing unit can be kept smaller than that generated by the contact member 10. In other words, the roller 14 made of the permanent magnet constitutes a rolling mechanism to reduce the frictional force between the permanent magnet and the magnetic body.

Fourth Embodiment

The driving devices described in the first to third embodiments can be each used to drive a lens. An example applying the driving devices according to the first to third embodiments to an image pickup apparatus (optical apparatus) will be described below as a fourth embodiment with reference to FIGS. 8A and 8B.

Figure 8A:
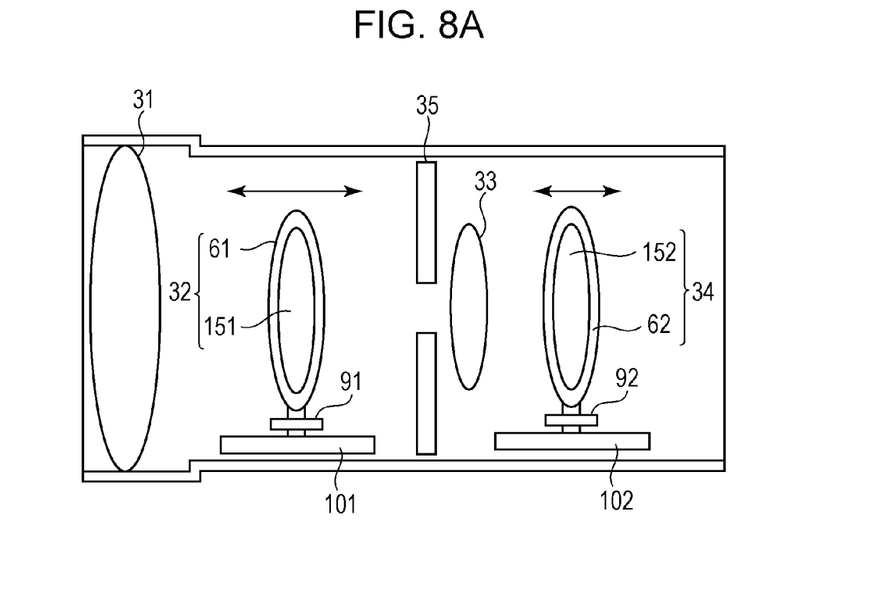
FIGS. 8A and 8B are schematic views to explain a lens barrel and an image pickup apparatus according to a fourth embodiment of the present invention.

FIG. 8A is a schematic sectional view of a lens barrel to which the present invention can be applied. As illustrated in FIG. 8A, the lens barrel includes a fixed first lens unit 31, a second lens unit 32 movable in the direction of an optical axis of incident light for an image zooming operation, a fixed third lens unit 33, and a fourth lens unit 34 movable in the direction of the optical axis for an image focusing operation. A light quantity adjusting unit 35 is a mechanism for increasing and decreasing an aperture diameter by moving a pair of diaphragm blades parallel to each other in the vertical direction.

Each image lens unit includes an image taking lens. The movable second lens unit 32 includes a lens 151 and a holding member 61, i.e., a lens holder for holding the lens 151. Similarly, the movable fourth lens unit 34 includes a lens 152 and a holding member 62, i.e., a lens holder for holding the lens 152.

The second lens unit 32 is fixed to a contact member 101. Therefore, when a vibrator 91 is driven, the second lens unit 32 is moved in the direction of the optical axis together with the vibrator 91. Similarly, the fourth lens unit 34 is fixed to a contact member 102. Therefore, when a vibrator 92 is driven, the fourth lens unit 34 is moved in the direction of the optical axis together with the vibrator 92. It is to be noted that the guide member 5 and the magnetic pressing mechanism, both illustrated in FIG. 1, are not illustrated in FIG. 8A.

Figure 8B:
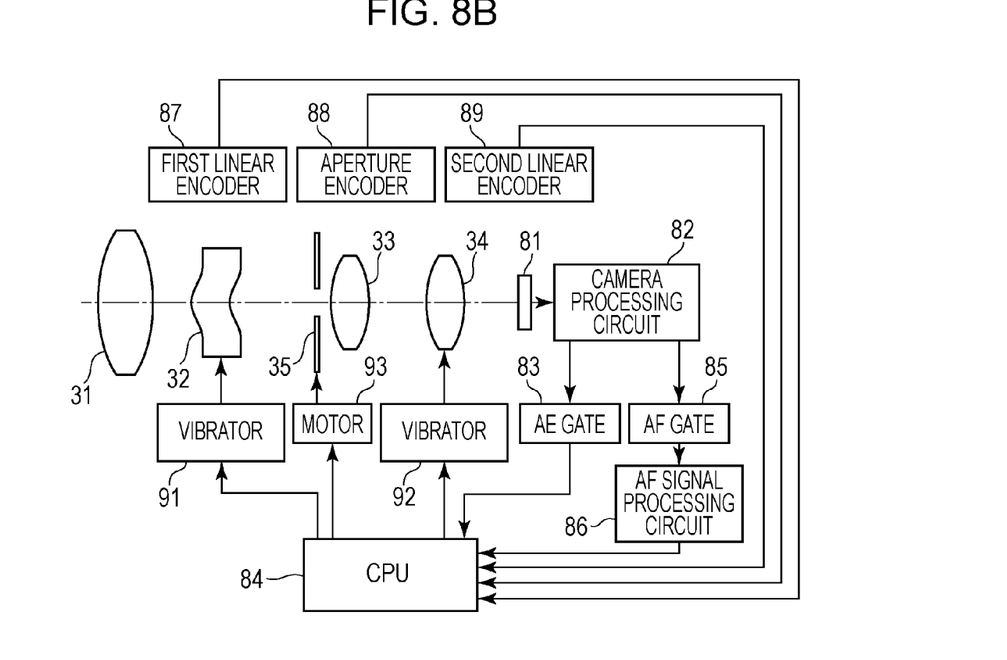

FIG. 8B is a block diagram to explain an image pickup apparatus (optical apparatus) equipped with the above-described lens barrel. An image pickup element 81 is arranged rearward of the first to fourth lens units 31 to 34 on the optical axis. An output of the image pickup element 81 is connected to a camera processing circuit 82. One output of the camera processing circuit 82 is connected to a CPU 84 through an AE (automatic exposure) gate 83, while the other output of the camera processing circuit 82 is connected to the CPU 84 through an AF (auto-focusing) gate 85 and an AF signal processing circuit 86.

Respective outputs of a first linear encoder 87 for detecting the position of the second lens unit 32, an aperture encoder 88 for detecting the aperture diameter of the light quantity adjusting unit 35, and a second linear encoder 89 for detecting the position of the fourth lens unit 34 are connected to the CPU 84. The first and second linear encoders 87 and 89 detect respectively relative positions of the second lens unit 32 and the fourth lens unit 34 (i.e., amounts through which the second and fourth lens units are moved from datum points) in the direction of the optical axis.

Outputs of the CPU 84 are connected to the vibrators 91 and 92 and to a motor 93 that is a driving source for the light quantity adjusting unit 35. The CPU 84 includes a control circuit configured to control the operation of the image pickup apparatus, and the camera processing circuit 82 carries out amplification, gamma correction, etc. on an output of the image pickup element 81. A contrast signal in an image signal after being subjected to the specific processing passes through each of the AE gate 83 and the AF gate 85. The AE gate 83 and the AF gate 85 set signal extracting regions, which are respectively optimum for exposure determination and focusing, from an entire image area. The AF signal processing circuit 86 adapted for auto-focusing (AF) extracts a high-frequency component of the image signal and produces an AF evaluation value signal.

As described above, the driving devices according to the first to fourth embodiments can be each used to drive the lens of the image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-271697 filed Dec. 6, 2010, which is hereby incorporated by reference herein in its entirety.

What is claimed is:

1. A driving device comprising:
   a vibrator having an elastic body and an electromechanical energy transducer fixed to the elastic body;
   a portion of a contact member arranged to contact with the vibrator;
   a permanent magnet;
   a magnetic body arranged proximate the permanent magnet to generate an attraction force between the permanent magnet and the magnetic body;
   a holding member arranged to hold the vibrator and the permanent magnet; and
   a guide member arranged to restrict a moving direction of the holding member,
   wherein a distance from the guide member to the vibrator is less than a distance from the guide member to the permanent magnet in a plane perpendicular to a guiding direction of the guide member,
   the attraction force between the permanent magnet and the magnetic body acts as a force to rotate the holding member about a longitudinal axis of the guide member, the vibrator being pressed against the contact member by the rotating force, and
   the vibrator and the contact member are moved relative to each other when an AC voltage is applied to the electromechanical energy transducer of the vibrator.

2. The driving device according to claim 1, wherein the permanent magnet and the magnetic body are not in contact with each other.

3. The driving device according to claim 1, further comprising a sliding member disposed on the magnetic body,
   wherein the permanent magnet and the magnetic body are in partial contact with each other and the sliding member interposed therebetween, and
   a frictional force between the sliding member and the permanent magnet is less than a frictional force between the vibrator and the contact member.

4. The driving device according to claim 1, wherein the permanent magnet and the magnetic body are contacted with each other, and
   the holding member includes a shaft for rotation and the permanent magnet is rotatable about the shaft for rotation such that the permanent magnet is rotated when the vibrator and the contact member are relatively moved.

5. A lens barrel comprising:
   a vibrator having an elastic body and an electromechanical energy transducer fixed to the elastic body;
   a portion of a contact member arranged to contact with the vibrator;
   a permanent magnet;
   a magnetic body arranged to generate an attraction force between the permanent magnet and the magnetic body;
   a lens;
   a holding member arranged to hold the vibrator, the permanent magnet, and the lens; and
   a guide member arranged to restrict a moving direction of the holding member,
   wherein a distance from the guide member to the vibrator is less than a distance from the guide member to the permanent magnet in a plane perpendicular to a guiding direction of the guide member,
   the attraction force between the permanent magnet and the magnetic body acts as a force rotating the holding member about an axis of the guide member, the vibrator being pressed against the contact member by the rotating force, and
   the holding member is moved by the force in a direction of an optical axis of light incident on the lens when an AC voltage is applied to the electromechanical energy transducer of the vibrator.

6. The lens barrel according to claim 5, wherein the permanent magnet and the magnetic body are not in contact with each other.

7. The lens barrel according to claim 5, further comprising a sliding member disposed on the magnetic body,
   wherein the permanent magnet and the magnetic body are contacted with each other with the sliding member interposed therebetween, and a frictional force between the sliding member and the permanent magnet is less than a frictional force between the vibrator and the contact member.

8. The lens barrel according to claim 5, wherein the permanent magnet and the magnetic body are contacted with each other, and
the holding member includes a shaft for rotation and the permanent magnet is rotatable about the shaft for rotation such that the permanent magnet is rotated when the holding member is moved.

9. An optical apparatus comprising the lens barrel according to claim 5, and an image pickup element at a position where light having passed through the lens enters the image pickup element.

* * * * *